(12) United States Patent
Davis et al.

(10) Patent No.: US 7,758,422 B2
(45) Date of Patent: Jul. 20, 2010

(54) HARD DRIVE AUTHENTICATION

(75) Inventors: Hedley C. Davis, Milpitas, CA (US); Prakash R. Stirret, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1351 days.

(21) Appl. No.: 11/106,393

(22) Filed: Apr. 13, 2005

(65) Prior Publication Data

US 2006/0234797 A1    Oct. 19, 2006

(51) Int. Cl.
- H04K 1/00      (2006.01)
- H04L 9/10      (2006.01)
- H04L 9/30      (2006.01)
- A63F 13/02     (2006.01)
- A63F 13/12     (2006.01)

(52) U.S. Cl. .............................. 463/29; 463/43; 463/44; 463/46; 380/251

(58) Field of Classification Search ................ 463/29, 463/43, 44, 46; 380/251, 28–30, 54, 2
See application file for complete search history.

(56) References Cited

U.S. PATENT DOCUMENTS

| | | | |
|---|---|---|---|
| 4,405,829 A | | 9/1983 | Rivest et al. ............... 178/22.1 |
| 4,453,074 A | | 6/1984 | Weinstein ................... 235/380 |
| 4,670,857 A | * | 6/1987 | Rackman ..................... 705/51 |
| 4,865,321 A | * | 9/1989 | Nakagawa et al. ............ 463/29 |
| 5,643,086 A | * | 7/1997 | Alcorn et al. ................. 463/29 |
| 5,734,752 A | * | 3/1998 | Knox ....................... 358/3.28 |
| 5,850,562 A | * | 12/1998 | Crump et al. .................. 713/1 |
| 6,034,930 A | * | 3/2000 | Kitahara .................. 369/47.15 |
| 6,071,190 A | * | 6/2000 | Weiss et al. .................... 463/25 |

(Continued)

FOREIGN PATENT DOCUMENTS

EP    0 661 675 A2 *    7/1995

(Continued)

OTHER PUBLICATIONS

BIOS Boot Specification, version 1.01, Jan. 11th, 1996 (Compaq, Phoenix, and Intel), downloaded from http://www.phoenix.com/NR/rdonlyres/56E38DE2-3E6F-4743-835F-B4A53726ABED/0/specsbbs101.pdf, on May 28, 2009.*

(Continued)

Primary Examiner—Peter DungBa Vo
Assistant Examiner—Matthew D. Hoel
(74) Attorney, Agent, or Firm—Woodcock Washburn LLP

(57)    ABSTRACT

A game console determines if a hard disk drive is authorized for use with the game console by analyzing an encrypted certificate. The encrypted certificate is stored in memory of the drive. Upon detection of the drive, the game console receives the encrypted certificate and decrypts it. The certificate contains parameters relating to the drive, such as the drives serial number, model number, memory capacity of the drive, and a trademark indicative of the drive's authenticity, for example. The game console also receives these parameters from the drive in unencrypted form. The parameters extracted from the encrypted certificate are compared with the parameters read from the hard disk drive's memory. If the parameters match, the drive is determined to be authentic. The certificate is encrypted with the private key of a public-private key pair and decrypted with the corresponding public key in accordance with well known public-key cryptographic techniques.

15 Claims, 6 Drawing Sheets

U.S. PATENT DOCUMENTS

| | | | | |
|---|---|---|---|---|
| 6,081,345 | A * | 6/2000 | Curry | 358/3.28 |
| 6,094,483 | A * | 7/2000 | Fridrich et al. | 380/28 |
| 6,106,396 | A * | 8/2000 | Alcorn et al. | 463/29 |
| 6,149,522 | A * | 11/2000 | Alcorn et al. | 463/29 |
| 6,192,139 | B1 * | 2/2001 | Tao | 382/100 |
| 6,252,971 | B1 * | 6/2001 | Wang | 382/100 |
| 6,263,086 | B1 * | 7/2001 | Wang | 382/100 |
| 6,263,431 | B1 * | 7/2001 | Lovelace et al. | 713/2 |
| 6,269,446 | B1 * | 7/2001 | Schumacher et al. | 713/176 |
| 6,394,905 | B1 | 5/2002 | Takeda et al. | 463/29 |
| 6,487,656 | B1 * | 11/2002 | Kim et al. | 713/2 |
| 6,513,709 | B1 * | 2/2003 | Hansen | 235/380 |
| 6,526,155 | B1 * | 2/2003 | Wang et al. | 382/100 |
| 7,426,750 | B2 * | 9/2008 | Cooper et al. | 726/26 |
| 2001/0051996 | A1 * | 12/2001 | Cooper et al. | 709/217 |
| 2002/0116615 | A1 * | 8/2002 | Nguyen et al. | 713/168 |
| 2002/0122300 | A1 * | 9/2002 | Nakamura et al. | 361/724 |
| 2003/0033521 | A1 * | 2/2003 | Sahlbach | 713/156 |
| 2003/0093668 | A1 | 5/2003 | Multerer et al. | |
| 2003/0206633 | A1 * | 11/2003 | Uchino | 380/246 |
| 2003/0216172 | A1 | 11/2003 | LeMay et al. | |
| 2004/0048660 | A1 | 3/2004 | Gentles et al. | |
| 2004/0054779 | A1 * | 3/2004 | Takeshima et al. | 709/225 |
| 2004/0071348 | A1 * | 4/2004 | Harrington et al. | 382/232 |
| 2004/0250077 | A1 * | 12/2004 | Jang et al. | 713/175 |
| 2005/0005150 | A1 * | 1/2005 | Ballard | 713/200 |
| 2006/0236103 | A1 * | 10/2006 | Starr et al. | 713/168 |

FOREIGN PATENT DOCUMENTS

JP        2005-039686 A  *  2/2005

OTHER PUBLICATIONS

Machine translation of JP 2005-039686 A, application JP 2003-276480, downloaded from http://dossier1.ipdl.inpit.go.jp, on May 28, 2009.*

* cited by examiner

US 7,758,422 B2

HARD DRIVE AUTHENTICATION

FIELD OF THE INVENTION

The present invention relates generally to game systems and more specifically relates to authentication of game console peripherals, such as hard disk drives.

BACKGROUND OF THE INVENTION

Game systems having consoles capable of being coupled to external peripheral devices, such as hard disk drives for example, are susceptible to various problems. Different suppliers can provide the external devices and the game consoles. Thus, it is conceivable that the external devices may not be compatible with the consoles. One possible problem arising from this situation is that connecting an external device to a console could cause damage to the console and/or the external device. It is also possible, regardless if a given console and external device are compatible, that widespread use of this pair could give the perception of a poor quality system. Or, the use of one manufacturer's external devices with another manufacturer's game consoles, could give the impression that one of the manufacturer's products is of poor quality. This could lead to loss of revenue/profit for at least one of the manufacturers.

Thus, a game system capable of determining if an external peripheral device is authorized for utilization with a game console is desired.

SUMMARY OF THE INVENTION

In an exemplary embodiment of the present invention, external peripheral devices for use with game consoles are authorized via the use of encrypted certificates. An encrypted certificate is stored in memory of an external game console peripheral device. When the game console detects the external device, the encrypted certificate is received by the game console and decrypted. The contents of the decrypted certificate are analyzed to determine the authenticity of the external device. If the external device is determined to be authentic, normal operations are permitted. If the external device is determined not to be authentic, subsequent interactions between the external device and the game console are prohibited.

The certificate comprises parameters relating to the external device. The device parameters can include the device ID, the device serial number, the device model number, and/or the memory capacity of the device for example. In one embodiment, the certificate comprises a mark, such as a trademark having an image for example, indicating the authenticity of the external device. The certificate is encrypted with the private key of a public-private key pair in accordance with well known public-key cryptographic techniques. The unencrypted device parameters and the encrypted certificate are stored in memory of the external device. The unencrypted mark is stored in the game console.

Upon detection of the external device by the game console, during power on or at some other appropriate time, the game console reads, from the external device, the unencrypted external device parameters. The game console also reads the encrypted certificate from the external device. The encrypted certificate is then decrypted with the corresponding public key of the public-private key pair. In an exemplary embodiment of the present invention, the public key is stored in the game console. The components of the decrypted certificate, e.g., the external device parameters and the mark, are compared with the unencrypted device parameters read from the external device and the mark read from the game console. If the comparisons indicate that the device parameters and the marks are the same, the external device is determined to be authentic. If the comparisons indicate that the device parameters and the marks are not the same, the external device is determined not to be authentic.

BRIEF DESCRIPTION OF THE DRAWINGS

The foregoing and other objects, aspects and advantages will be better understood from the following detailed description with reference to the drawings, in which.

DETAILED DESCRIPTION OF ILLUSTRATIVE EMBODIMENTS

Figure 1:
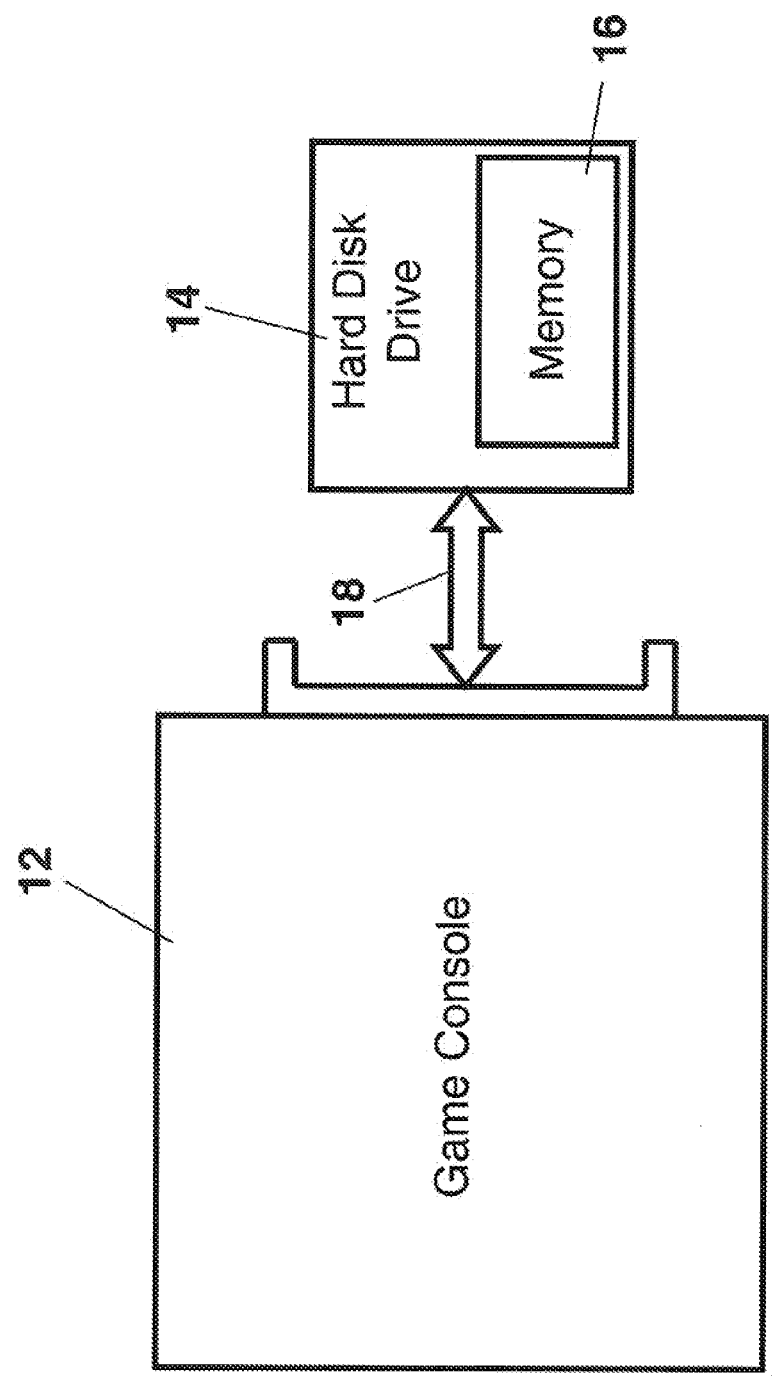
FIG. 1 is a depiction of a game system comprising a game console and an external peripheral device in accordance with an exemplary embodiment of the present invention.

FIG. 1 is a depiction of a game system comprising a game console 12 and an external peripheral device 14 in accordance with an exemplary embodiment of the present invention. Game systems are known in the art. An example of a known game system is Microsoft Corporation's Xbox® game system. As described herein, the external peripheral device 14 is characterized as a hard disk drive, but should not be limited thereto. The external peripheral device can include any appropriate external device having memory, such as other types of external memory devices (e.g., optical drives, memory sticks), game controllers, displays, or a combination thereof, for example. The external hard disk drive 14 is coupleable to the game console 12, such that the external hard disk drive 14 is in communication with the game console 12. Arrow 18 indicates the communication means between the game console 12 and the hard disk drive 14. The communication means 18 can comprise any appropriate communication means, such as a hardwired communication means, a wireless communication means (e.g., infrared, electromagnetic), a mechanical/electrical communication means (e.g., a pin and socket connection, a USB connection), an optical communications means, or a combination thereof, for example. In an exemplary embodiment of the invention, the communications means 18 is in compliance with the well known Serial ATA (SATA) interface specification. The hard disk drive 14 comprises storage means, such as memory 16 therein.

Figure 2:
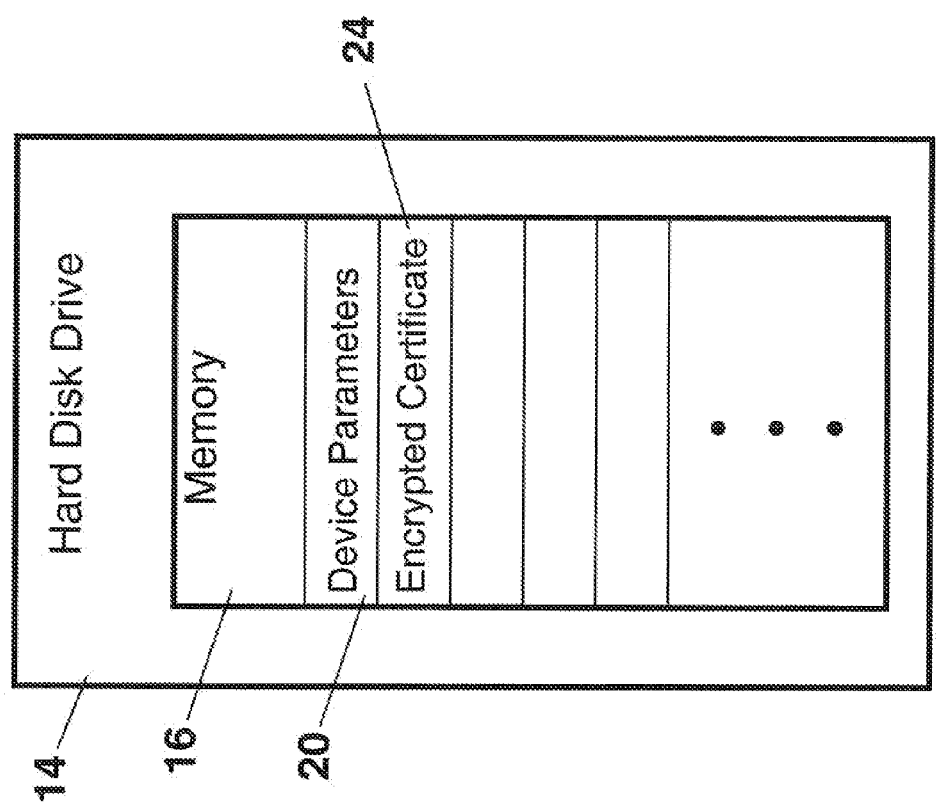
FIG. 2 is a diagram of the hard disk drive comprising device parameters and an encrypted certificate stored in memory, in accordance with an exemplary embodiment of the present invention.

FIG. 2 is a diagram of the hard disk drive 14 comprising device parameters 20 and an encrypted certificate 24 stored in memory 16, in accordance with an exemplary embodiment of the present invention. The memory 16, has stored therein, device parameters 20 pertaining to the particular hard disk drive 14. The device parameters 20 can include any appropriate parameter pertaining to the hard disk drive 14. Appropriate parameters 20 include an identification number of the hard disk drive 14, a serial number of the hard disk drive 14, a model number of the hard disk drive 14, the memory capacity of the memory 16 in the hard disk drive 14, or a combination thereof, for example. The device parameters 20 are stored in the memory 16 in unencrypted form. It is envisioned that the device parameters 20 are stored in the memory 16 by the supplier of the hard disk drive 14. In an exemplary embodiment of the present invention, the device parameters 20 are stored in read only memory (ROM), or the like, thus preventing access and/or modification thereof. The memory capacity is envisioned to be the amount of memory that is available to a user. Thus, it is to be understood that the memory capacity of the memory 16 can be dependent upon where the device parameters 20 are stored. For example, if the device parameters 20 are stored in ROM, the memory capacity of the memory 16 will not be affected. However, if the device parameters 20 are not stored in ROM, than the memory capacity could be reduced by the size of the device parameters 20 stored in the memory 16.

The memory 16 comprises the encrypted certificate 24. The certificate is encrypted with a private key of a public-key cryptosystem key pair. Public key cryptography is known in the art. Any appropriate public key cryptographic system can be used, such as the known RSA cryptographic cipher, for example. A description of the RSA cryptography cipher is found in U.S. Pat. No. 4,405,829, entitled "Cryptographic Communications System and Method," which issued on Sep. 20, 1983, in the names of Rivest, Shamir, and Adleman. U.S. Pat. No. 4,405,829 is incorporated by reference as background information. Public key cryptography uses a pair of keys. One key is used to encrypt and the other is used to decrypt. Knowledge of one key does not provide knowledge of the other key. Typically one key is kept secret, and thus called the private key. The other key typically is made public. In accordance with an exemplary embodiment of the invention, the certificate is encrypted with the private key and is decrypted with the public key.

Figure 3:
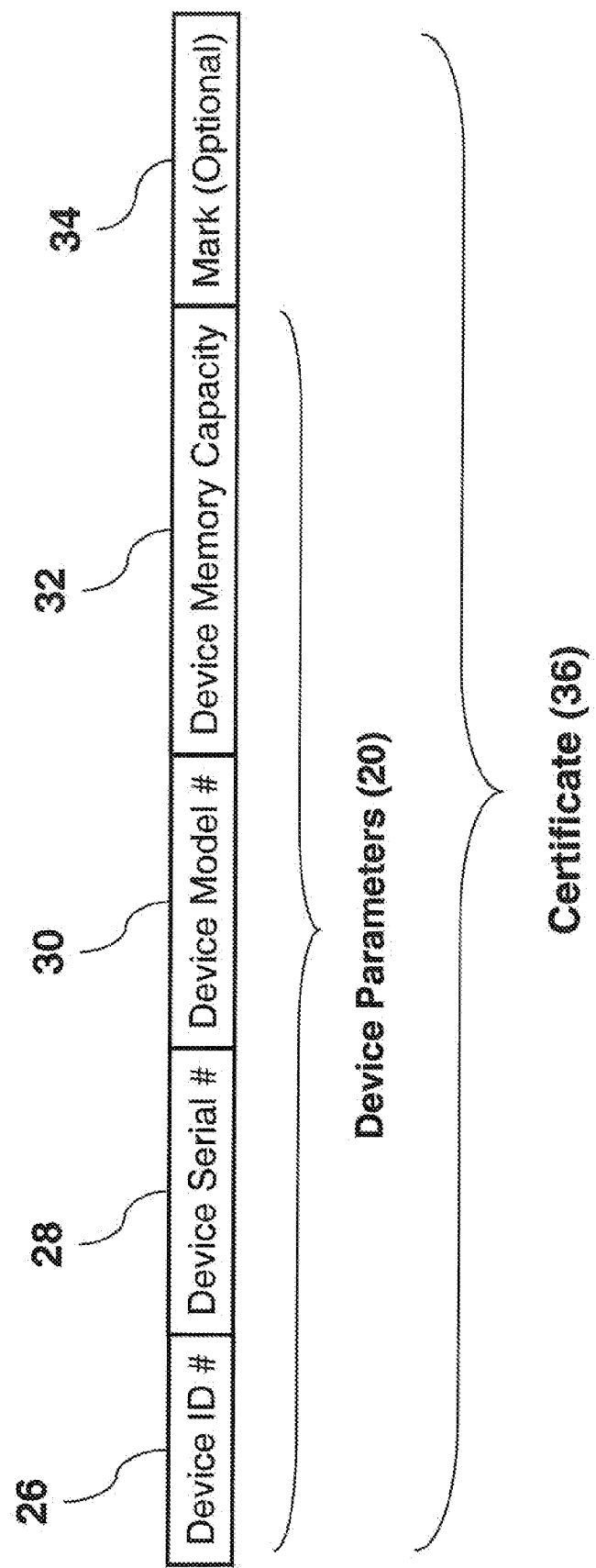
FIG. 3 is a depiction of a certificate in accordance with an exemplary embodiment of the present invention.

FIG. 3 is a depiction of an exemplary certificate 36. The certificate 36 comprises the device parameters 20 and optionally, a mark 34. The device parameters 20 comprise an identification number 26 of the external device, a serial number 28 of the external device, a model number 30 of the external device, the memory capacity 32 of the memory of the external device, and an optional mark 34. It is emphasized that the selection of device parameters and the format of the certificate as shown in FIG. 3 are exemplary. Many suppliers of external devices store parameter information in the memory of the external device in a publicly accessible location.

Inclusion of the mark 34 in the certificate 36 is optional. That is, the certificate 36 can comprise the mark 34, however inclusion of the mark 34 is not necessary. The mark 34 can comprise any appropriate mark indicating the authenticity of the hard disk drive 14. The mark 34 can comprise an image, text, or a combination thereof. For example, the mark 34 can comprise the text "Hard Drive by Microsoft®." The mark 34 is an indication that the hard disk drive 14 has been authorized for use with the game console 12. The mark 34 is an indication that the hard disk drive 14 has been endorsed by the supplier/manufacturer of the game console 12. In an exemplary embodiment of the invention, the mark 34 is stored in the game console 12 in unencrypted form.

The mark 34 is an indication of the authenticity of the external drive. The mark 34 also serves as an endorsement of the external device by the game console supplier. As described below, the mark 34 can be displayed when the external device is authenticated, providing an endorsement to a user that the external device has been approved for use with the game console. The mark 34 can be a trademark with or without an image indicating the source of the operating system or supplier of the game console.

Figure 4:
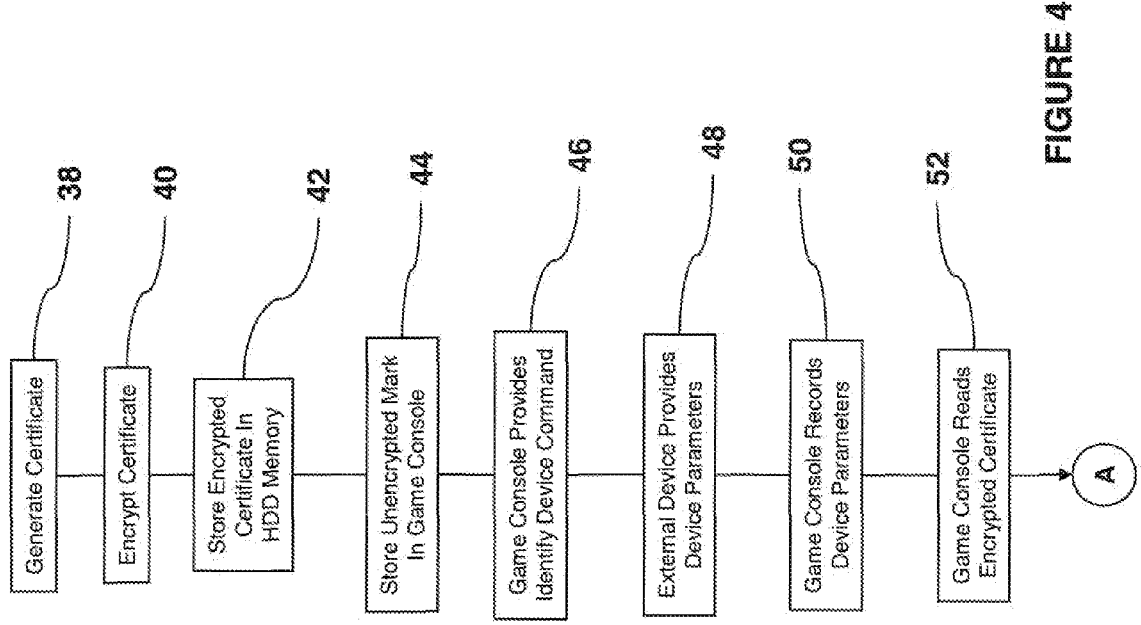
FIG. 4 is a flow diagram of an authentication process in accordance with an exemplary embodiment of the present invention.
Figure 5:
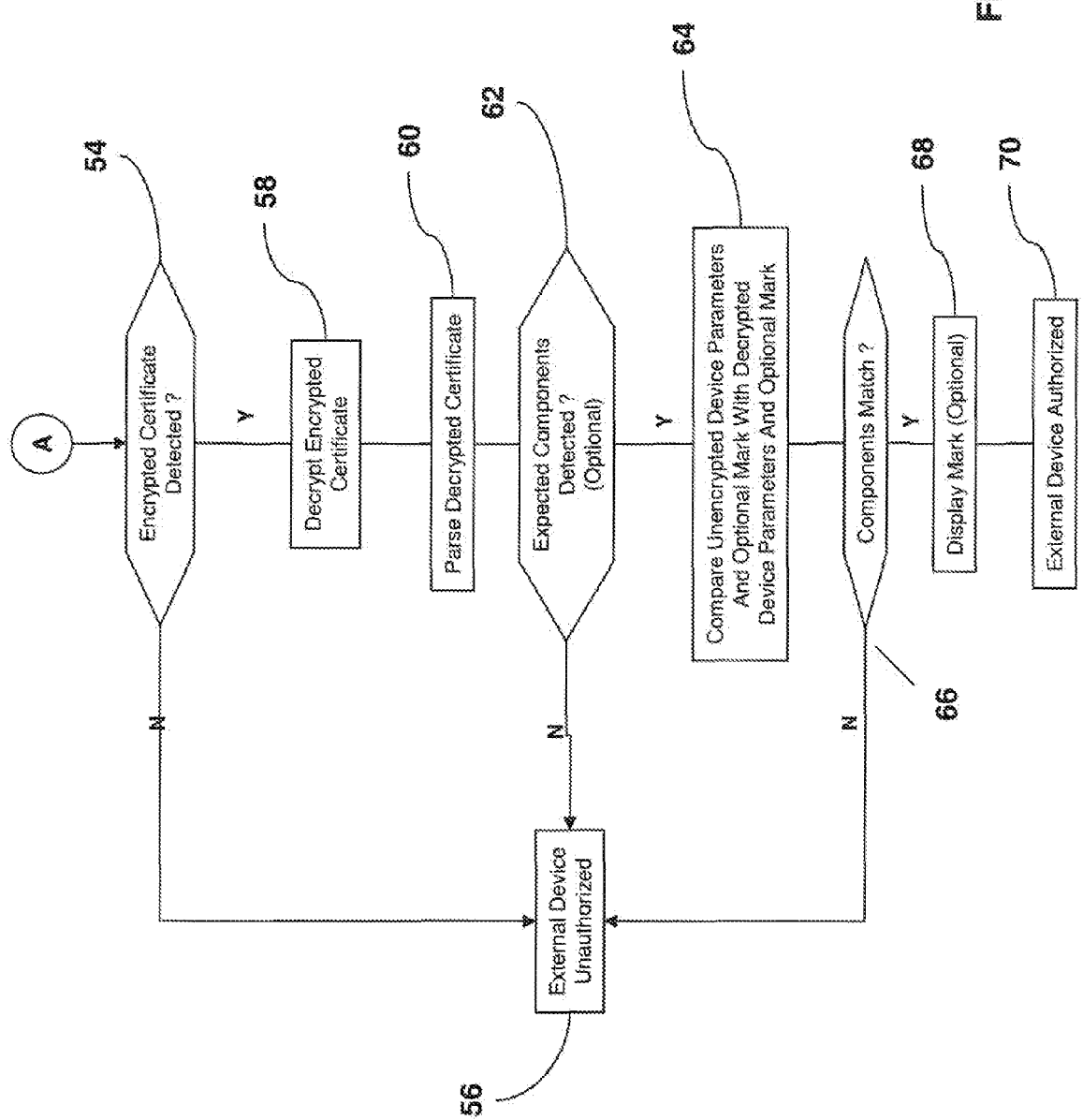
FIG. 5 is a continuation of FIG. 4.

FIG. 4 and FIG. 5 are a flow diagram of an authentication process in accordance with an exemplary embodiment of the present invention. The certificate is generated at step 38. Generating the certificate comprises selecting external device parameters and combining the selected parameters and optional mark. The selected parameters and mark can be combined in any appropriate manner, such as by concatenation for example. In an exemplary embodiment of the present invention, the game console supplier generates the certificate 36 by extracting the selected device parameters from the memory of the external device and optionally concatenating the selected device parameters with one of its marks, if used.

The certificate is encrypted at step 40. The certificate is encrypted with the private key of a public-key cryptosystem key pair. The encrypted certificate is stored in the memory of the external device at step 42. For example, the encrypted certificate can be stored in an accessible location in the memory 16 of the hard disk drive 14, as shown in FIG. 2. The mark is stored in unencrypted form in the game console at step 44. In an exemplary embodiment, it is envisioned that a game console supplier will select device parameters and will generate the certificate 36 from the selected device parameters and one of the game console supplier's marks. The certificate 36 will then be encrypted and the encrypted certificate will be stored in a predetermined location of memory in the external device.

In another exemplary embodiment, the certificate comprises device parameters common to a type, or subset, of external devices, such as model number and memory capacity for example. These common device parameters are provided to the game console supplier for incorporation into the certificate. Because this certificate contains information common to a type of external device, a copy of the certificate can be used with all external devices of that type. Regardless of the logistics of certificate generation and recording, the encrypted certificate is ultimately stored in memory of the external device.

When an external device is detected by a game console the game console will read unencrypted device parameters stored in memory of the external device at steps 46 and 48. The external device can be detected at power on, during a reset condition, in response to the occurrence of a predetermined event (e.g., specific error conditions), or a combination thereof. As described above, in an exemplary embodiment of the invention, communication between the game console and the external device is in accordance with the SATA specification. In accordance with the SATA specification, upon detection of an external device, the game console provides an "Identify Device" command signal to the external device (step 46). In response to this command signal, the external device provides to the game console the device parameters relating to the specific external device (step 48). The game console records the received device parameters by storing them in game console memory at step 50. As used herein, the term memory can include registers.

At step 52 the game console attempts to read the encrypted certificate from the external device. If an encrypted certificate is not detected (step 54), the external device is determined to be unauthorized (step 56). If the encrypted certificate is detected (step 54), the encrypted certificate is decrypted at step 58. The decryption is accomplished utilizing the corresponding public key of the public-key cryptosystem key pair. In an exemplary embodiment of the invention, the public key is stored in the game console and is available for use to determine the authenticity of any external device coupled to the game console. The components of the decrypted certificate are parsed into device parameters and optional mark at step 60. It is determined, at step 62, if the decrypted certificate parsed into the expected components (device parameters and optional mark). If the expected components are not detected, the external device is determined to be unauthorized (step 56). Step 62 is optional. That is, the authentication process can proceed from parsing the decrypted certificate at step 62 to comparing parsed components at step 64, without first determining if all expected components are not detected.

At step 64, the components (device parameters and optional mark) of the parsed decrypted certificate are compared with the previously recorded components (device parameters read from external device and the optional mark stored in the game console). If corresponding components do not match (step 66), the external device is determined to be unauthorized (step 56). If corresponding components do match (step 66), the mark can be displayed at step 68. Displaying of the mark is optional. It is envisioned that displaying the mark will give a user confidence that the external device is authorized for use with the game console, and that game operations should perform as expected. If corresponding components do match (step 66) the external device is determined to be authentic at step 70.

If an external device is determined to be authentic, the system is permitted to operate normally. If an external device is determined to be unauthentic, the system can shut down, display an error message, prohibit subsequent interaction between the game console and the external device, or a combination thereof.

Figure 6:
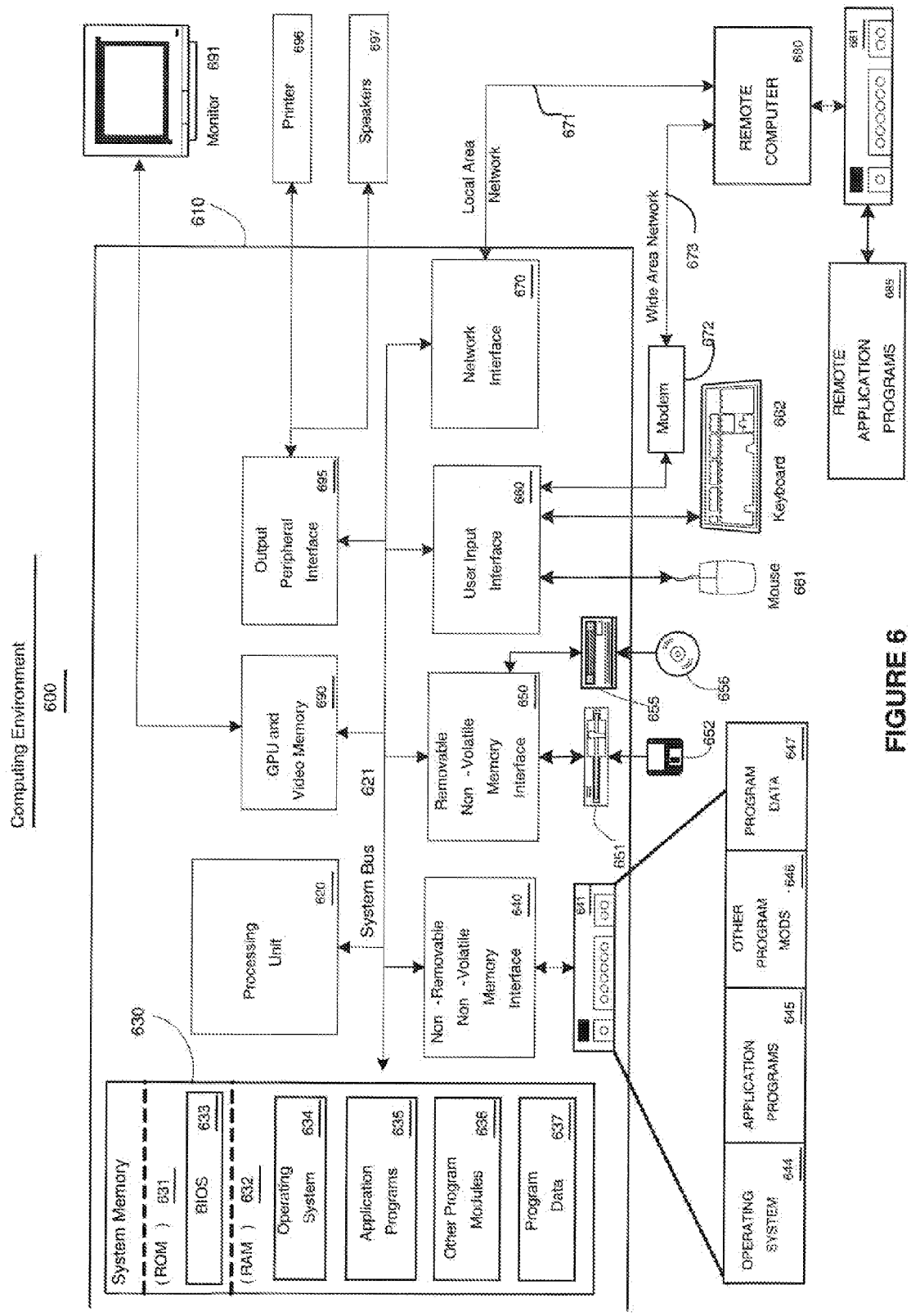
FIG. 6 illustrates an example of a suitable computing system environment in which an exemplary embodiment of the present invention can be implemented.

Although the description of the present invention has been in the context of an exemplary game system, it is also applicable to more generic computing environments wherein the authenticity of a peripheral device is to be determined. FIG. 6 illustrates an example of a suitable computing system environment 600 in which an exemplary embodiment of the present invention can be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, telephones, PDAs, audio equipment, photography equipment, test equipment, automotives, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing the invention includes a general purpose computing device in the form of a computer 610. In an exemplary embodiment of the present invention, a game console comprises computer 610. Components of computer 610 can include, but are not limited to, a processing unit 620, a system memory 630, and a system bus 621 that couples various system components including the system memory to the processing unit 620. The system bus 621 can be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 610 typically includes a variety of computer readable media. Computer readable media can be any available media that can be accessed by computer 610 and includes both volatile and non-volatile media, removable and non-removable media. By way of example, and not limitation, computer readable media can comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 630 includes computer storage media in the form of volatile and/or non-volatile memory such as ROM 631 and RAM 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 can also include other removable/non-removable, volatile/non-volatile computer storage media. By way of example only, FIG. 6 illustrates a hard disk drive 641 that reads from or writes to non-removable, non-volatile magnetic media, a magnetic disk drive 651 that reads from or writes to a removable, non-volatile magnetic disk 652, and an optical disk drive 655 that reads from or writes to a removable, and non-volatile optical disk 656, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies.

A user can enter commands and information into the computer 610 through input devices such as a keyboard 662 and pointing device 661, commonly referred to as a mouse, trackball or touch pad. Other input devices (not shown) can include a microphone, joystick, game pad, satellite dish, scanner, or the like. These and other input devices are often connected to the processing unit 620 through a user input interface 660 that is coupled to the system bus, but can be connected by other interface and bus structures, such as a parallel port, game port or a universal serial bus (USB).

A monitor 691 or other type of display device is also connected to the system bus 621 via an interface, such as a video interface, which can comprise a graphics processing unit (GPU) and video memory 690. In addition to the monitor, computers can also include other peripheral output devices such as speakers 697 and printer 696, which can be connected through an output peripheral interface 695.

The computer 610 can operate in a networked environment using logical connections to one or more remote computers, such as a remote computer 680. The remote computer 680 can be a personal computer, a server, a router, a network PC, a peer device or other common network node, and typically includes many or all of the elements described above relative to the computer 610, although only a memory storage device 681 has been illustrated in FIG. 6. The logical connections depicted include a LAN 671 and a WAN 673, but can also include other networks. Such networking environments are commonplace in offices, enterprise-wide computer networks, intranets and the internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the internet. The modem 672, which can be internal or external, can be connected to the system bus 621 via the user input interface 660, or other appropriate mechanism. In a networked environment, program modules depicted relative to the computer 610, or portions thereof, can be stored in the remote memory storage device. By way of example, and not limitation, FIG. 6 illustrates remote application programs 685 as residing on memory device 681. It will be appreciated that the network connections shown are exemplary and other means of establishing a communications link between the computers can be used.

As mentioned above, while exemplary embodiments of the present invention have been described in connection with various computing devices, the underlying concepts can be applied to any computing device or system in which it is desired to authenticate peripherals.

The various techniques described herein can be implemented in connection with hardware or software or, where appropriate, with a combination of both. Thus, the methods and apparatus of the present invention, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus of the present invention can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention can invariably be a combination of hardware and software.

While the present invention has been described in connection with the preferred embodiments of the various figures, it is to be understood that other similar embodiments can be used or modifications and additions can be made to the described embodiments for performing the same function of the present invention without deviating therefrom. Therefore, the present invention should not be limited to any single embodiment, but rather should be construed in breadth and scope in accordance with the appended claims.

What is claimed:

1. A method for authenticating a game console peripheral, said method comprising:
   receiving from said peripheral by a game console, an unencrypted first device identification parameter;
   querying said peripheral to determine the presence of an encrypted certificate of authenticity encrypted with a private key of a public-private key cryptographic key pair;
   when said encrypted certificate is not present in said peripheral, declaring said peripheral an unauthorized peripheral;
   when said encrypted certificate is present in said peripheral, retrieving said encrypted certificate;

decrypting said encrypted certificate with a corresponding public key of said cryptographic key pair, for retrieving a second device identification parameter contained in said encrypted certificate, said second device identification parameter comprising a mark indicative of an authenticity of said peripheral;

comparing said first device identification parameter received in unencrypted form from said peripheral, against said second device identification parameter obtained by decrypting said encrypted certificate further received from said peripheral, and comparing said mark decrypted from said encrypted certificate that is retrieved from said peripheral against an unencrypted mark that is stored in said game console; and declaring said peripheral an authorized peripheral upon determining that said first device identification parameter matches said second device identification parameter.

2. A method in accordance with claim 1, wherein said encrypted certificate is formed, at least in part, by encrypting a trademark.

3. A method in accordance with claim 2, wherein
said trademark includes an image;
said second identification parameter comprises at least one of a serial number of said peripheral, a model of said peripheral, or a memory capacity of said peripheral; and
said encrypted certificate is formed, at least in part, by encrypting said image with said second identification parameter.

4. A method in accordance with claim 3, wherein declaring said peripheral an authorized peripheral comprises displaying the image on a display of said game console.

5. A method in accordance with claim 1, wherein said peripheral comprises a hard disk drive.

6. A method in accordance with claim 1, wherein said second identification parameter comprises at least one of a serial number of said peripheral, a model of said peripheral, or a memory capacity of said peripheral.

7. A method in accordance with claim 1, wherein said second device identification parameter provides an identification of a specific type of device.

8. An authentication system comprising:
a peripheral in which is stored a) a first device identification parameter in an unencrypted format, and b) an encrypted certificate containing a second device identification parameter in an encrypted format, said second device identification parameter comprising a mark indicative of an authenticity of said peripheral, said encrypted certificate encrypted with a private key of a cryptographic key pair; and
a game console configured for:
receiving said first device identification parameter in said unencrypted format;
querying said peripheral to verify the presence of an encrypted certificate of authenticity;
if said encrypted certificate is not present in said peripheral, declaring said peripheral an unauthorized peripheral;
else, if said encrypted certificate is present in said peripheral, retrieving said encrypted certificate;
decrypting said encrypted certificate with a corresponding public key of said cryptographic key pair, for retrieving said second device identification parameter;
comparing said first device identification parameter received in said unencrypted format from said peripheral, against said second device identification parameter obtained by decrypting said encrypted certificate further received from said peripheral, and comparing said mark decrypted from said encrypted certificate that is retrieved from said peripheral against an unencrypted mark that is stored in said game console; and declaring said peripheral an authorized peripheral upon determining that said first device identification parameter matches said second device identification parameter.

9. A system in accordance with claim 8, wherein said mark comprises a representation of a trademark.

10. A system in accordance with claim 8, wherein said game console displays said mark as an indication that said peripheral has been determined to be an authorized peripheral.

11. A system in accordance with claim 8, wherein said peripheral comprises a hard disk drive.

12. A system in accordance with claim 8, wherein said second identification parameter comprises at least one of a serial number of said peripheral, a model of said peripheral, and a memory capacity of memory of said peripheral.

13. A method for generating an authentication certificate, said method comprising:
generating a certificate by retrieving a set of device parameters that is stored in an unencrypted format in a first portion of an external storage device, and combining the retrieved set of device parameters with an endorsement mark that indicates authenticity of the external storage device;
encrypting said certificate;
storing said encrypted certificate in a second portion of the external storage device;
communicatively coupling the external storage device to a game console;
reading into the game console, the set of device parameters retrieved from the first portion of the external storage device;
querying the external device to obtain the encrypted certificate from the second portion of the external storage device;
determining that the external storage device is not authentic upon detecting an absence of the encrypted certificate in the external storage device;
else, if present in external storage device, retrieving the encrypted certificate into the game console;
decrypting the encrypted certificate to retrieve the endorsement mark and the set of device parameters contained therein;
comparing the retrieved endorsement mark with a copy of the endorsement mark stored in the game console; and
determining that the external storage device is authentic upon detecting a match between the endorsement mark retrieved from the encrypted certificate and the copy of the endorsement mark stored in the game console.

14. A method in accordance with claim 13, wherein combining the retrieved set of device parameters with the endorsement mark comprises concatenating the endorsement mark with the set of device parameters.

15. A method in accordance with claim 13, wherein the first portion of the external storage device comprises a memory location that is publicly accessible and provides memory capacity information of the external storage device, and wherein the second portion of the external storage device comprises a predetermined memory location selected for storing the encrypted certificate.

* * * * *